Oct. 23, 1951     F. L. ANGLIM     2,572,427
TROLLING DEVICE
Filed Feb. 4, 1948     2 SHEETS—SHEET 1
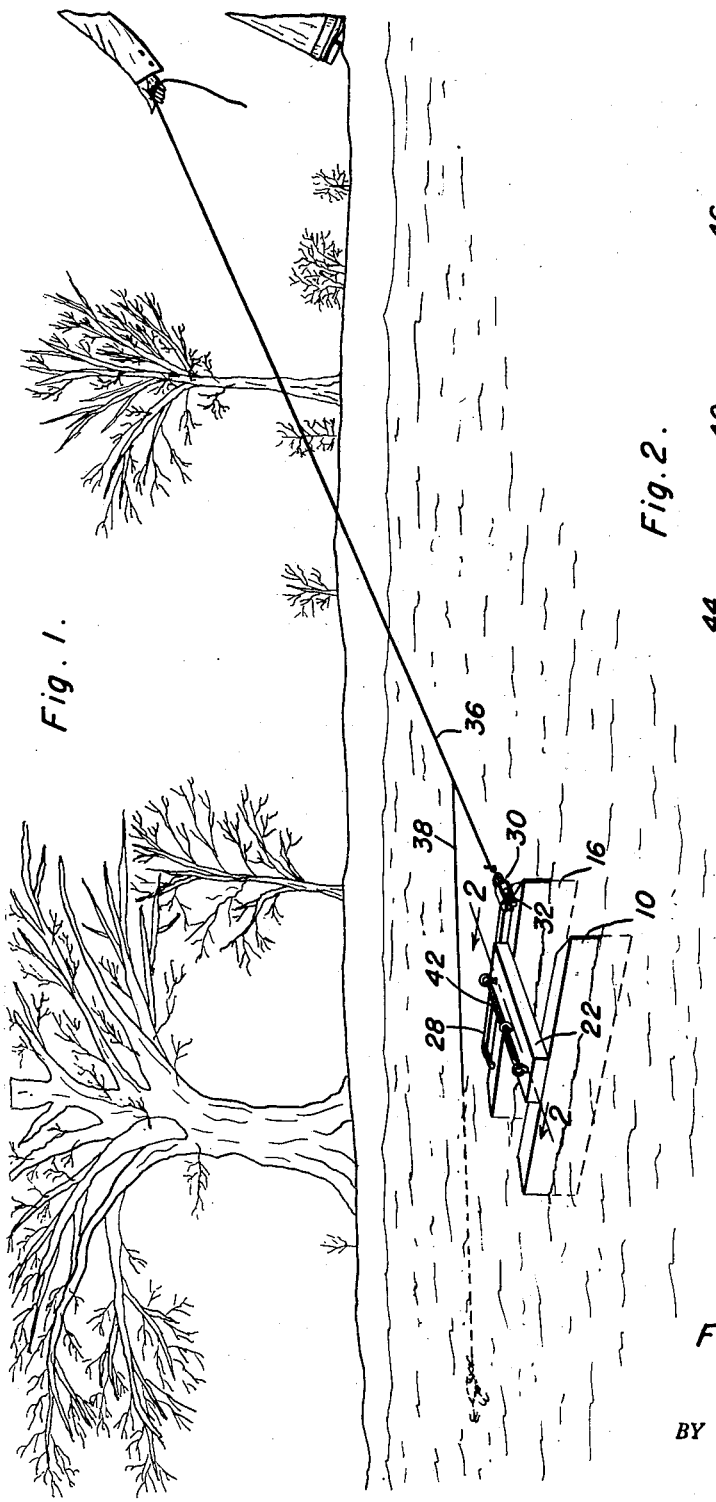
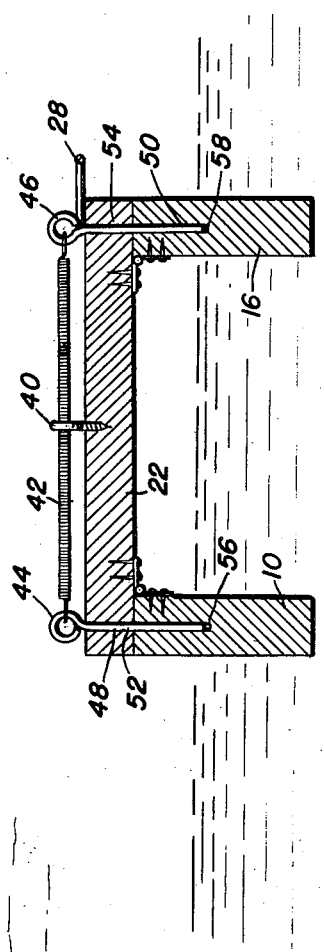
Frank L. Anglim
INVENTOR.
BY *Clarence A. O'Brien*
*and Harvey B. Jackson*
Attorneys Oct. 23, 1951     F. L. ANGLIM     2,572,427
TROLLING DEVICE
Filed Feb. 4, 1948     2 SHEETS—SHEET 2
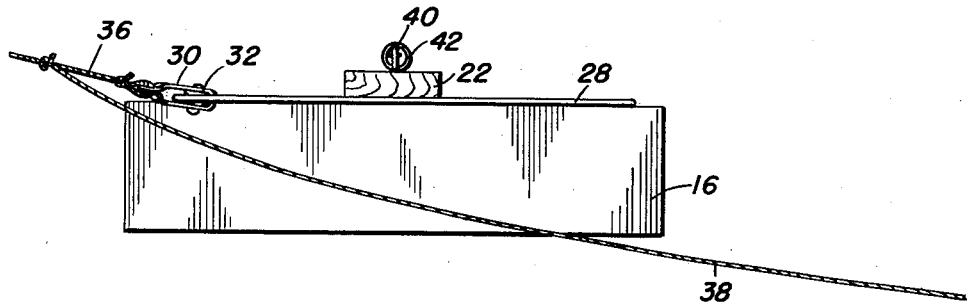
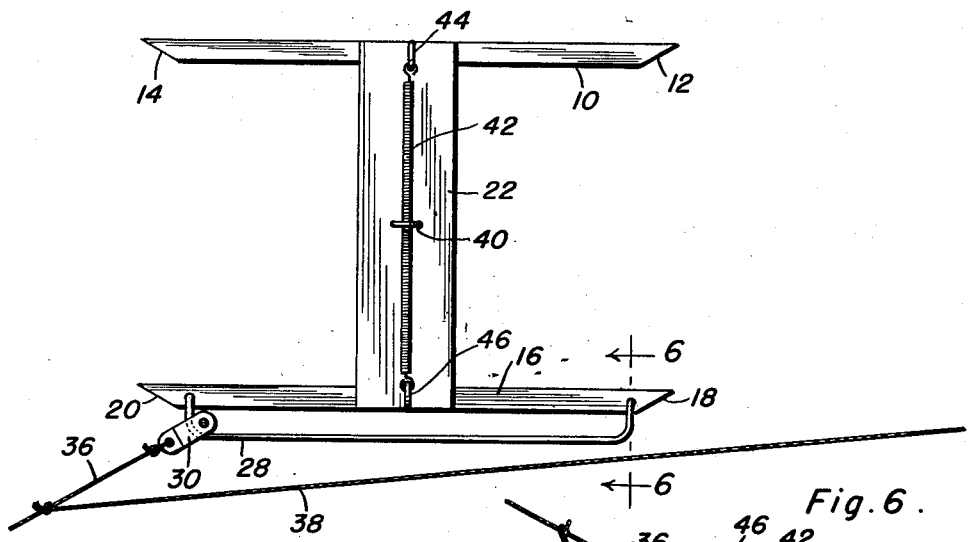
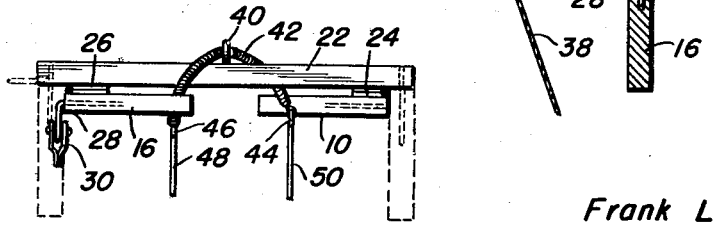
Frank L. Anglim
INVENTOR.

Patented Oct. 23, 1951

2,572,427

UNITED STATES PATENT OFFICE 2,572,427

TROLLING DEVICE

Frank L. Anglim, Marquette, Mich.

Application February 4, 1948, Serial No. 6,281

4 Claims. (Cl. 43—43.13)

This invention appertains to novel and useful improvements in fishing appurtenances.

An object of this invention is to carry a fish line and other appurtenances a distance from a shore line, boat, bridge or the like while trolling.

Another object of this invention is to provide improved means for carrying out the above mentioned functions.

A still further object of this invention is to slidingly support a drag line to a base member having a beveled edge, whereby the beveled edge will direct the drag line and fish bait a distance from the operator of the invention or fisherman.

Another object of this invention is to provide a second base member spaced from the said first base member, both of said base members being hingedly associated with a cross member whereby the base members may be collapsed when found desirable.

Another object of this invention is to maintain the base members in a selected hinged position while the device is in operation.

Another object of this invention is to provide an extremely simplified device of the character described which lends itself well to commercial manufacture.

Other objects and features of novelty will become apparent to those skilled in the art, and following the description of the preferred form of the invention, illustrated in the accompanying drawings, wherein:

Figure 1 is a pictorial view illustrating the invention in use;

Figure 2 is a sectional view taken substantially on line 2—2 of Figure 1 and in the direction of the arrows;

Figure 3 is a side view of the device illustrated in Figure 1;

Figure 4 is a plan view of the preferred form of the invention;

Figure 5 is an end view showing the device collapsed, and;

Figure 6 is a sectional view taken substantially on line 6—6 of Figure 4 and in the direction of the arrows.

This invention has been developed to provide a device for improved fishing conditions, whereby trolling may be done by an individual along the shore line of a stream or the like without the necessity of a boat. The trolling may take place any practical distance from the shore, depending upon the size of trolling line utilized.

A first base member 10 is supplied with a beveled leading edge 12 and a beveled trailing edge 14. A second substantially identical base member 16 is supplied with beveled leading and trailing edges 18 and 20 respectively and is spaced from the said base member 10 by means of a support block 22. The base members and support members are preferably composed of a buoyant material, such as certain grades of wood.

A pair of conventional hinges 24 and 26 respectively are used for connecting the side base members or elements 10 and 16 with the cross or support member 22. This of course, renders the side or base members 10 and 16 hingedly associated with the cross or support member 22.

A substantially U-shaped bracket 28 is attached to said side member 16 and has a rider 30 thereon. This rider is preferably a bracket having a pulley or roller therein. Of course, the rider is free to travel the longitudinal distance or length of the substantially U-shaped bracket 28.

A drag line 36 is attached to the said rider 30 to be towed by hand or attached to a pertinent portion of a boat. A bait bearing line 38 is secured to the said drag line 36, a distance spaced from said bracket 30.

Means are provided for maintaining the side members 10 and 16 in such position that they are perpendicular to the cross or support member 22. The preferable means consists of an eye member 40 attached to the said supporting block or member 22 with a spring or other suitable resilient biasing means 42 extending therethrough. The ends of the said spring are attached to eyes 44 and 46 at the upper ends of the pins or shanks 48 and 50. These shanks have their lower ends passed through suitable apertures 52 and 54 formed in the said supporting block 22. The lower ends of the shanks also extend in bores 56 and 58 formed in the said side members 10 and 16 to thereby hold the side members 10 and 16 in the condition shown in Figure 2.

When the shanks are in the positions illustrated in Figure 2, that is in the associated apertures and bores, the sides 10 and 16 are retained in the open positions. However, when the shanks are removed as is shown in Figure 5, the side members 10 and 16 are permitted to be pivoted about the hinge pins of the said hinges 24 and 26, and the spring prevents separation of the shanks 48 and 50 from the device.

In operation the device is urged a distance from the shore line or from a boat due to the beveled edges of the said side or base members and therefore, the fishing bait attached to the line 38 is urged a distance from the shore line. Fishing operations may then take place in the more desirable portions of a stream, lake or the like.

It is apparent that certain variations including changes as in size and shape may be made without departing from the spirit of the invention. Accordingly, limitation is sought only in accordance with the scope of the following claims.

Having described the invention, what is claimed as new is:

1. A trolling device comprising a buoyant support, buoyant base members, means disposed at opposite ends of said support hingedly fixing said base members to the ends of said support for movement to a position substantially perpendicular to said support and to a position substantially parallel to said support, means carried by said support for retaining said base members in the perpendicular position with respect to said support including a pair of pins, and said base members and said support having apertures removably seating said pins.

2. A trolling device comprising a support, base members, means disposed at opposite ends of said support hingedly fixing said base members to the ends of said support for movement to a position substantially perpendicular to said support and to a position substantially parallel to said support, means carried by said support for retaining said base members in the perpendicular position with respect to said support including a pair of pins, said base members and said support having apertures removably seating said pins, and a resilient member secured to said support and having said pins attached to the ends thereof.

3. In a trolling device which includes a support having an aperture therein and at least one base member having an aperture, said base member having means attached thereto for movably connecting said base member to said support and having an opening therein, the improvement which comprises: a resilient element attached to said support, and a locking member disposed at one end of said resilient element removably disposed in said apertures maintaining said base member and said support in a predetermined position.

4. In a trolling device including a support having openings therein adjacent opposite ends thereof, a pair of base members, means hingedly connecting each base member to said support adjacent the ends having said openings therein, said base members having apertures therein, a spring fixed to said support, locking members carried by opposite ends of said spring and removably disposed in the apertures in said base members and said support retaining said base members substantially normal to said support.

FRANK L. ANGLIM.

REFERENCES CITED

The following references are of record in the file of this patent:

UNITED STATES PATENTS

| Number | Name | Date |
| --- | --- | --- |
| 262,987 | Scarborough | Aug. 22, 1882 |
| 809,965 | Lystne | Jan. 16, 1906 |
| 1,203,783 | Reischmann | Nov. 7, 1916 |
| 1,282,830 | Herzog | Oct. 29, 1918 |
| 1,307,623 | Edmundson | June 24, 1919 |
| 1,596,753 | Moore | Aug. 17, 1926 |
| 1,723,236 | Hansen | Aug. 6, 1929 |